Sept. 14, 1965  E. W. HOFFMEISTER  3,205,596
JUMPING SHOE
Filed Oct. 26, 1961  6 Sheets-Sheet 1

INVENTOR.
ERNST W. HOFFMEISTER
BY Walter S. Bleston
ATTORNEY

INVENTOR.
ERNST W. HOFFMEISTER
BY Walter S. Pleston
ATTORNEY

Sept. 14, 1965   E. W. HOFFMEISTER   3,205,596
JUMPING SHOE

Filed Oct. 26, 1961   6 Sheets-Sheet 4

INVENTOR.
ERNST W. HOFFMEISTER
BY Walter S. Heston
ATTORNEY

Sept. 14, 1965  E. W. HOFFMEISTER  3,205,596
JUMPING SHOE
Filed Oct. 26, 1961  6 Sheets-Sheet 5

INVENTOR.
ERNST W. HOFFMEISTER
BY Walter S. Pleston
ATTORNEY

Sept. 14, 1965 E. W. HOFFMEISTER 3,205,596
JUMPING SHOE
Filed Oct. 26, 1961 6 Sheets-Sheet 6

INVENTOR.
ERNST W. HOFFMEISTER
BY Walter S. Oleston
ATTORNEY

United States Patent Office 3,205,596
Patented Sept. 14, 1965

3,205,596
JUMPING SHOE
Ernst W. Hoffmeister, 95 Lawton Blvd., Suite 408,
Toronto 7, Ontario, Canada
Filed Oct. 26, 1961, Ser. No. 147,968
16 Claims. (Cl. 36—7.8)

The present invention relates to a jumping apparatus and more particularly to resilient shoes which are similar in certain respects to the jumping apparatus or stilts described in my copending applications for patents, Serial No. 830,108, filed July 28, 1959, now Patent No. 3,065,962, and Serial No. 103,766, filed April 18, 1961, now Patent No. 3,110,492.

Generally two resilient stilts according to my mentioned earlier applications are used at a time—one stilt for each of the user's feet. Such a stilt comprises a platform on which the user's foot rests and a supporting or foot member which bears on the ground during a standstill or at the end of a jump performed with the stilts. A pole in connection with the platform and the foot member and provided with a hand grip serves to hold the platform and foot member in a proper vertical relationship. The platform and supporting member are connected by a spring or springs taking up and accumulating the energy of the down-coming body of the jumper thereby to assist the latter in reaching a substantial height in a subsequent jump. Also according to my aforementoned copending applications, the spring or springs are formed of rubber bands or lamellae placed side by side but slightly distanced from one another so as to create an air space between each two adjacent lamellae. Such rubber springs are arranged substantially vertically and are tensioned under the user's load, and the platform travels up and down in relation to the foot member as the rubber lamellae contract and stretch.

The present invention aims to improve the aforementioned devices and to provide a jumping apparatus or jumping shoe which does not require the pole of the earlier devices and in which the distance travelled by the platform in relation to the foot member is reduced as compared with the stretched length of the rubber lamellae, and in which the weight of the device may also be reduced in relation to the earlier jumping equipment.

The invention also aims to provide a jumping shoe with transmitting means whereby a relatively short vertical movement of a platform under load in relation to a supporting element is taken up by a relatively long horizontal stretching of a spring restraining the platform movement.

Another object of the invention is the provision of a jumping shoe in which the resilient rubber lamellae are arranged substantially horizontal between the spreadable points to an extensible linkage which is intercalated between the platform and the foot member. In a special form, the linkage comprises two elongated elements which carry the platform on their upper spreadable ends and have a common pivot at their lower ends connected to the foot member. The upper ends of the elongated elements are guided on the underside of the platform when changing their spacing owing to a changing tension of the rubber lamellae or spring due to a change of the load of the shoe during the performance of a jump.

The invention also aims to provide a jumping shoe of the mentioned type with means whereby the foot member is held substantially vertically below the center of the platform. Such means may consist of a rod rigidly connected to the foot member and arranged sideways of the platform, the rod being passed through a lateral projection thereof so that the platform is guided on the rod when moving up and down in relation to the foot member.

According to another object of the invention, the mentioned linkage is arranged substantially in a vertical plane in the form of an extensible device substantially similar to a lazy tongs which has its central line horizontal or parallel to the plane of the platform. Between the longitudinally spreadable end pivots of the linkage the rubber lamellae are stretched, whereas a pair of lateral upper pivots which are less spreadable than the end pivots are connected to the platform and guided on the underside thereof, and a lower median pivot is connected to the foot member of the shoe.

In another form of the invention in which the rubber lamellae are attached to an extensible device similar to lazy tongs, the lower median pivot is unsupported whereas the lower lateral pivots are equipped with supporting means which may be in the form of rollers whereby the apparatus becomes a roller-skate-jumping shoe, or they may be in the form of ice skates whereby the apparatus becomes an ice-skate-jumping shoe.

Further objects and details of the invention will be apparent from the description given hereinafter and the accompanying drawing illustrating several embodiments thereof by way of example.

In the drawing:

FIG. 8 is a similar view of the modification of FIG. 7 under maximum load.

Figure 1:
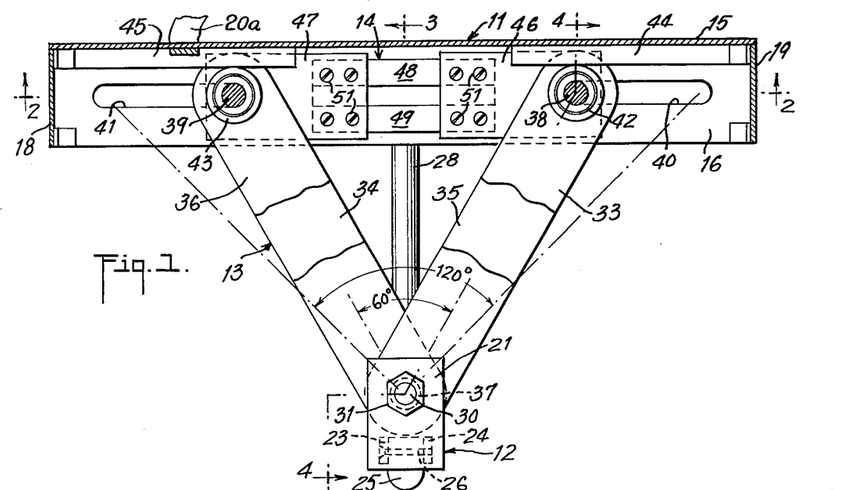
FIG. 1 is a side elevation partly in section of an apparatus according to the invention.
Figure 2:
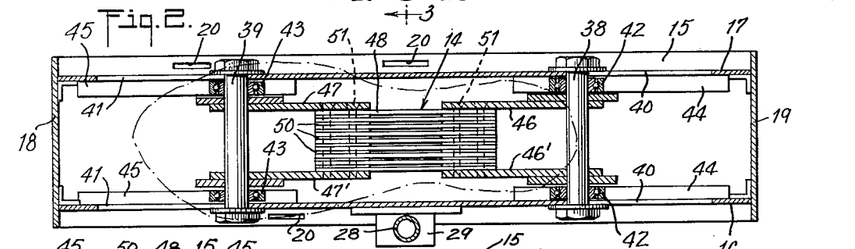
FIGS. 2, 3, and 4 are sections along lines 2—2, 3—3, and 4—4, respectively, of FIG. 1.
Figure 3:
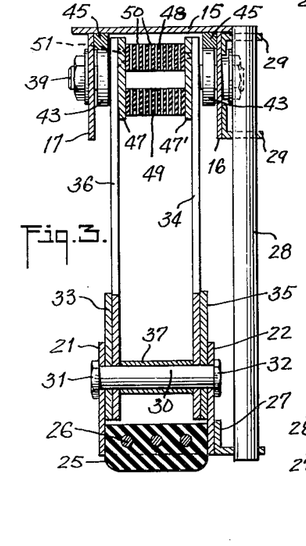
Figure 4:
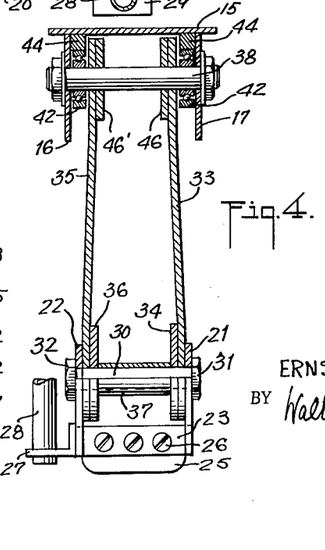

Referring now to the drawing, FIGS. 1 to 4, the illustrated device is one of the two shoes, namely that for the right foot, of a jumping apparatus according to my invention. The shoe for the left foot is a mirror image of that of FIGS. 1 to 4 wherefore it is not specifically shown. The illustrated jumping shoe comprises as its main parts a platform on which the user's foot rests and which is denoted in general by 11, a foot member or supporting means 12, connecting links in general denoted by 13 and one or several rubber springs 14. The platform is designed as a box open at the bottom with a flat top plate 15, side walls 16 and 17, front wall 18 and rear wall 19. Means are provided to secure the user's foot to the platform. Such means may be of various well known designs and are merely diagrammatically illustrated as slots 20 for binding thongs 20a of which one only is shown in FIG. 1. However, more elaborate means may be provided and I have found of particular usefulness bindings which are automatically releasable when an undue strain is exercised on them. Such bindings are conventionally applied to skis, and one of the many different types on the market is e.g. described in U.S. Patent No. 2,491,485 to Durham. The foot member or supporting means 12 comprises two parallel spaced side plates 21 and 22 to which two clamping plates 23 and 24 are secured by means not shown. Between the plates 21, 22, 23 and 24, a rubber buffer 25 is fastened with the aid of screws 26 so that the lowermost buffer portion projects from underneath those plates. Means may be provided to prevent the foot member from tilting and to hold it in the position shown in the drawing. For this purpose plate 22 is provided with a lateral foot extension 27 to which a vertically directed rod 28 is secured. The rod is passed with a sliding fit through lateral extensions 29 of the platform 11 and thus prevents the foot member 12 from tilting even if the shoe comes down on the ground in a forwardly or backwardly inclined position. A pivot bolt 30 having a head 31 and nut 32 is passed through the support plates 21 and 22. Elongated flat links 33, 34, 35 and 36 are turnably mounted on the bolt 30. A spacer sleeve 37 is arranged on the bolt between the links 34 and 36. Links 33 and 35 may be so bent that their upper ends are in planes with the upper ends of the links 34 and 36 respectively. The upper ends of the links 33 and 34 are so spread that these links enclose an angle of about 60° when the device is not loaded. The upper ends of the links 35 and 36 are spaced from each other the same distance as those of the links 33 and 34. The upper ends of the links 33 and 35 are connected by a pivot pin 38 and the upper ends of links 34 and 36 are connected by a pivot pin 39. Pin 38 is shiftable in horizontal slots 40 and pivot pin 39 is shiftable in horizontal slots 41 in the side walls of the platform box 11. The angular position of the links spread 60° apart is attained when the pivot pins 38 and 39 are at the inner ends of the slots 40 and 41. In order to reduce friction it is advisable to prevent a direct contact, i.e. pressure between those pins and the edges of the slots when the pins move outwards, as it will be described hereinafter. For this purpose, ball bearings 42 and 43 are mounted on pins 38 and 39 respectively, between the upper ends of the links 33, 34 and side wall 17 and between links 35 and 36 and side wall 16. The outer races of the bearings run on rail members 44 and 45. Two spaced clamping plates 46 and 46' are suspended from pivot pin 38 and similar clamping plates 47 and 47' are suspended from pin 39. Between these pairs of plates the rubber spring member 14 is horizontally stretched. The spring 14 consists of two sets 48 and 49 of rubber bands, the one above the other, with the planes of the bands vertically directed. Between each two adjacent bands a thin spacer 50 is located in order to create air gaps between the bands, for a reason explained at length in my copending application Serial No. 830,108. In order to creaate a high degree of friction between the clamped ends of the rubber bands or lamelae, I found a coarse, double-sided flint paper especially useful for the spacer material. However, other spacer materials may also be used successfully. The clamping of each spring end between the respective clamping plates 46, 46' and 47, 47' is effected by countersunk screws 51 passed through the plates and bands, as clearly shown in FIG. 3.

In order to compensate the hysteresis occurring in rubber springs as also explained in the mentioned application Serial No. 830,108, it is recommended to attach the springs with a preliminary tension so that they are stretched about 20% of their non-tensioned length of the non-clamped spring portion when the links are at an angle of 60°, i.e. when the jumping shoe is not loaded. On the other hand, I have found it advisable so to select the preliminary tension that it corresponds to a static load on one shoe by the total weight of the user's body, in other words, that the platform does not yet begin to sink when the user stands with his full weight on one shoe.

Now it will be understood that when bumper 25 rests on the ground and the platform 11 is loaded by the weight or impact of a jumping user of the device, the pivot pins 38 and 39 will move outwards in the slots 40 and 41 and the angle between the links 33 and 34 and between 35 and 36 will increase from its original 60° up to a maximum of 120° when the pins 38 and 39 are in their outermost positions in the slots 40 and 41. Commensurate with such movement of the pins 38, 39 and the links 33, 34, 35, 36, the rubber bands or lamellae of the sets 48 and 49 of the spring 14 will be stretched and the platform 11 will be lowered so that the distance between the platform and the supporting member 12 will be decreased. The position of the maximum displacement of the parts is entered in dot-and-dash lines in FIG. 1.

The device operates in the following manner: If the shoes are attached to the user's feet and the user is standing on the platforms 11, the latter will not have started to move downward owing to the aforementioned preliminary tension of the rubber springs. If then the user forcefully pushes down his whole weight on one shoe the loaded platform will come slightly down while the pins 38 and 39 will move somewhat outward in the slots 40, 41 as far as the tensioning of the spring 14 permits. If, then, the user tries to jump, the relaxing spring will assist the jumping movement so that upon the coming down of the jumper the platform, owing to the impact, will further approach the support member thereby causing a further tensioning of the spring. The latter when relaxing upon the subsequent jumping movement will release a greater force assisting the next jump. This continues until first the shoes are lifted from the ground and finally the maximum height of a jump is reached and the spring is tensioned according to the dash-dot position of the parts in FIG. 1. In an actually produced apparatus of the described and illustrated type, the following data have been found: For a maximum jumping height of 36", i.e. under the impact of the user's weight of 160 lbs. coming down from 36" height, the tensioning of the spring having an original length of 1.875" between the clamps amounted to 6.75", or the total length of the spring was 8.625" for a total spread of the links from an original 60° to the maximum of 120°.

Figure 5:
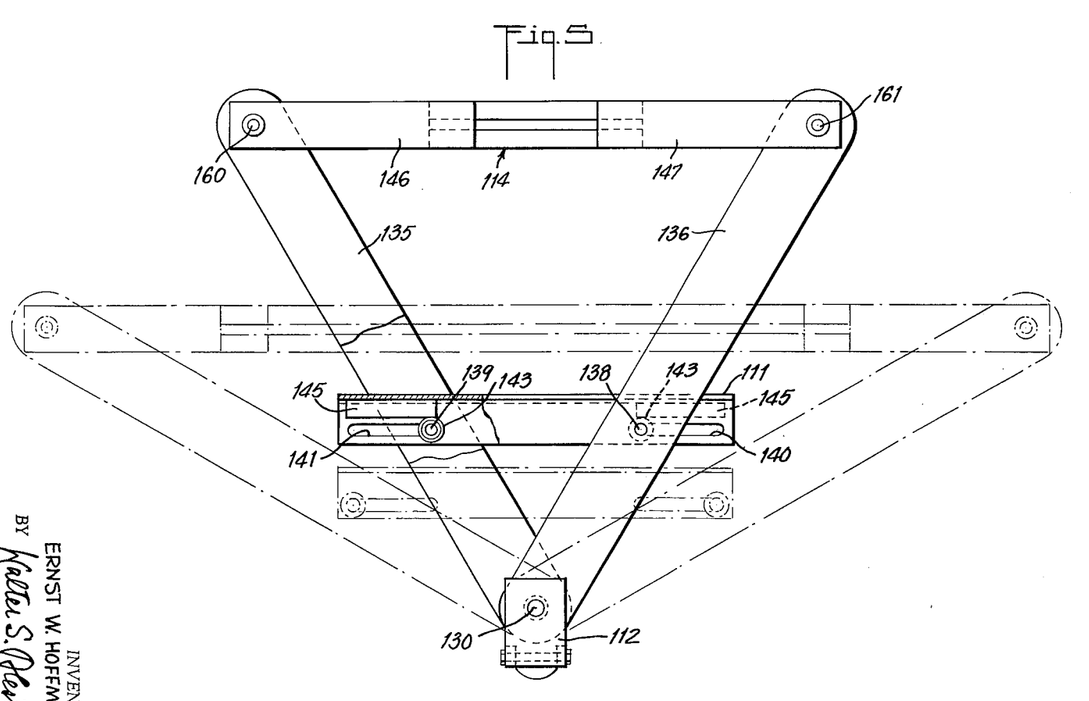
FIG. 5 is a diagrammatic side elevation similar to FIG. 1 of a modification.

It is also possible to extend the links and to arrange the springs above the platform. Such a modification is diagrammatically illustrated in FIG. 5. In this modification, the platform 111 is provided with side wall slots 140, 141 in which the pivot pins 138 and 139 can shift. The pins are secured to the links 135, 136 intermediate the ends of the latter and are provided with ball bearings 143 the outer races of which roll against the rails 145. The lower ends of the links 135, 136 are mounted on the pivot bolt 130 of the support or foot member 112. The upper ends of the links contain the pivot pins 160, 161 which in the unloaded condition of the apparatus are located rather substantially above the platform 111, and which in the position of maximum load (dash-dot lines) are still above the latter. The spring clamping plates 146 and 147 are suspended from the pins 160, 161, respectively, and carry the spring 114 secured to the clamping plates. It will be understood that in FIG. 5 only one pair of links is visible but that there are two such pairs. In the illustrated embodiment the two pairs of links must be spaced so far apart that they are in vertical planes on either side of the user's leg. In this structure each pair of links 135, 136 holds one spring 114 which can be very considerably longer and can be elongated much more than a spring in FIGS. 1 to 4. For instance, a spring of 4" useful length when not loaded can be provided which under maximum impact stretches to a total length of about 18.5". In other respects the structure of FIG. 5 is similar to the preceding embodiment. It allows the user to enjoy a substantially softer spring. However, reinforced elements will be necessary, the weight and cost of a shoe will be greater than of the device of FIGS. 1 to 4, and the fact that the links extend laterally of the user's legs is doubtlessly a drawback in comparison with the structure in which there is no lateral confinement of the legs.

A greater elongation of the spring can also be obtained in another structure which is preferred to the one described with reference to FIG. 5. Such preferred structure is diagrammatically illustrated in FIG. 6. It will be noticed that all the elements are arranged underneath the top plate 215 of the platform 211. In this structure use is made of the lazy tongs principle. In the median vertical, transverse, plane of the member 211, a pivot pin 260 is passed through the side wall 216, and, of course also through the corresponding other side wall of the platform 211. The side wall is provided with the two longitudinal slots 240, 241 in which the two pins 238 and 239 can shift. As in preceding embodiments the ball bearings 243 are provided on the pins 238, 239 so as to roll against the rails 245. From pin 260 two links 261 and 262 are downwards divergingly directed whereas two links 235 and 236 extend convergingly downwards to the supporting member or foot 212 where they have a common pivot on the bolt 230 and are comparable with the aforementioned links 35, 36. Where links 235 and 261 cross each other, they are connected by a pivot pin 263. There is a similar pivot pin 264 connecting the links 236 and 262. Further pivot pins 265 and 266 are provided at the lower ends of the links 261 and 262, respectively. Short links 267, 268, 269 and 270 are also pivoted on the pins 239, 265, 238 and 266, respectively, and the links 267 and 268 are connected with their other ends by a pin 271. A correspondingly located pin 272 connects links 269 and 270. Thus, pins 271 and 272 constitute the end pivots of the structure. They and the pins 263 and 264 are located on the horizontal central line c—c of the lazy tongs linkage. Clamps 273 and 274 for the spring 214 extend from the pins 271 and 272, respectively, towards each other. The laminated spring 214 comprises two spaced sets of rubber bands 248 and 249, the one above the other, secured to the clamps by screws 251, and constructed as described with respect to the spring 14 in FIGS. 1 to 4. The spacing 275 of the sets and slots 276 in the clamps are so arranged that the pins 263 and 264 can travel in that spacing and in and out of those slots. A foot member 212 with buffer 225 is provided in connection with the pivot pin 230. It may be of any suitable design e.g. as the foot member 12 hereinbefore described. However, there is no guide rod such as 28 in order to prevent the foot member from tilting. Instead thereof two leaf springs 277 and 278 are provided which bear against the sides of the links 235, 236, respectively. They are attached to the foot member 212 by means of the screws 226. The lower pivots 265 and 266 carry also ancillary buffers 279 and 280 which are on a somewhat higher level than the central buffer 225 but can bear on the ground, the one or the other, together with the buffer when the apparatus tilts forward or backward.

Figure 9:
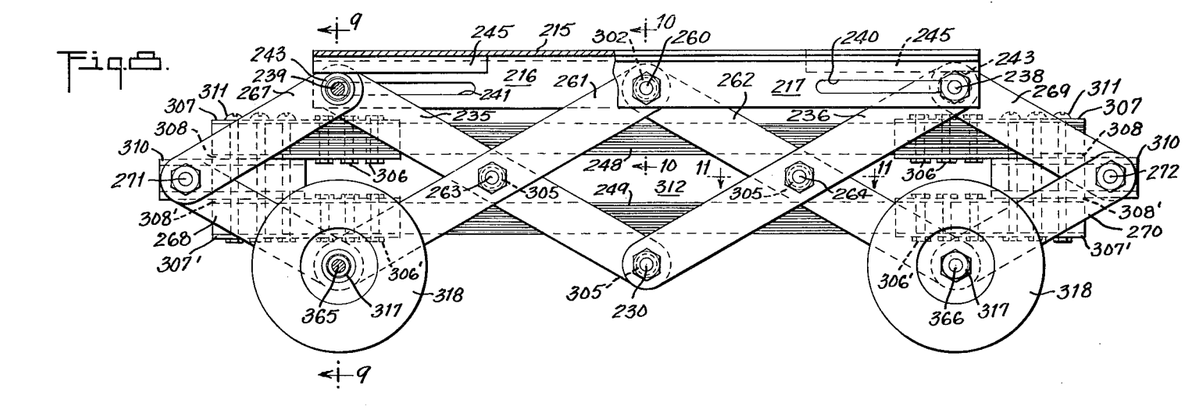
FIGS. 9 to 11 are sections according to lines 9—9, 10—10 and 11—11, respectively of FIG. 8.
Figures 9, 10, 11, 14:
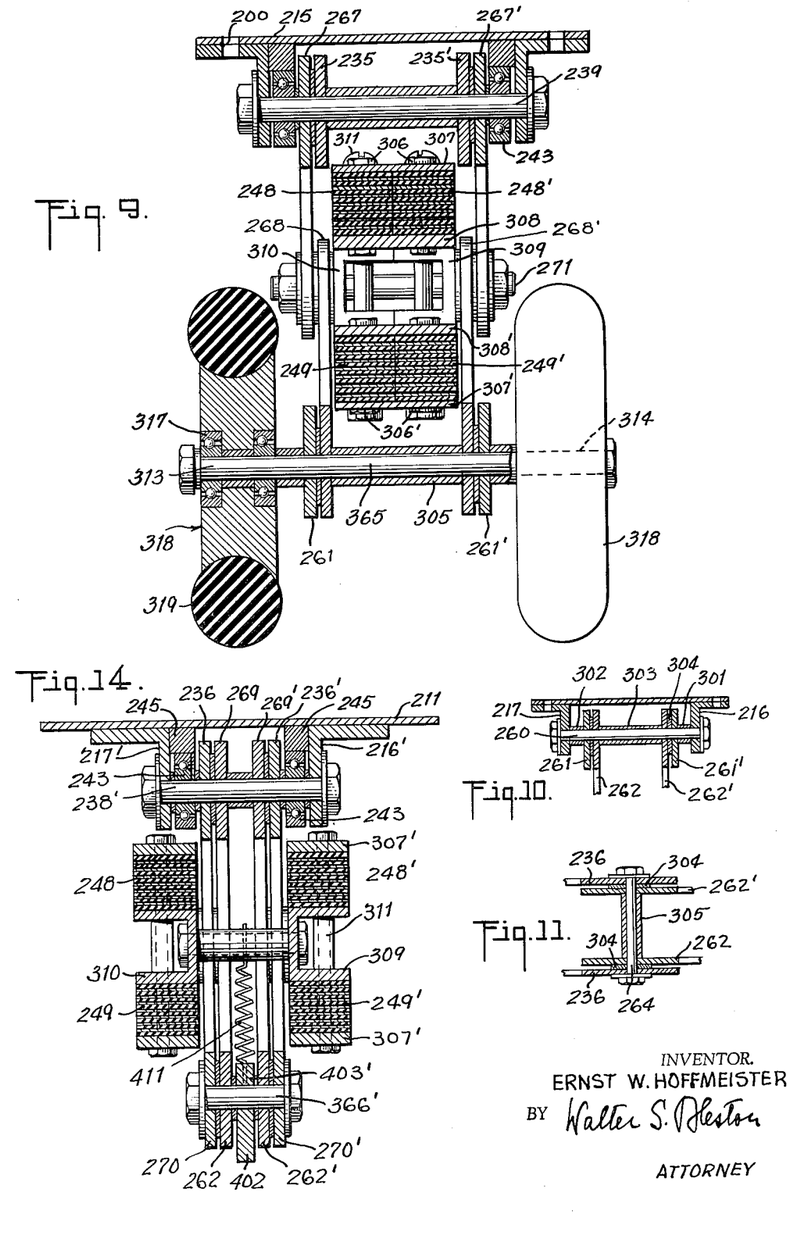
FIG. 14 is a section along line 14—14 in FIG. 13.

A similar but modified structure is shown in FIGS. 7 to 12. In this embodiment there are, the same as in FIG. 6, the platform top plate 215 with slots 200 for the thongs (not shown), the upper and lower median pivot pins 260 and 230, the upper and lower front pivot pins 239 and 365, the upper and lower rear pivot pins 238 and 366, the front and rear end pivot pins 271 and 272, and the central forward and rearward pivot pins 263 and 264. There are also the downwardly converging links 235 and 236, the downwardly diverging links 261, 262, the upper and lower front end links 267 and 268 and the upper and lower rear end links 269 and 270. The upper median pivot pin 260 is fixed in the platform side walls 216 and 217, as clearly shown in FIG. 10 and carries the top ends of the links 261, 261', 262 and 262'. As best seen in FIG. 10, short spacer sleves 301 and 302 are respectively located on pin 260 between side wall 216 and link 261' and between side wall 217 and link 261, and a longer spacer sleeve 303 holds the links 262 and 262' apart. Washers 304 are provided wherever suitable to reduce friction between two adjacent movable parts as e.g. between links 261 and 262 and links 261' and 262'. Other spacer sleeves 305 are located on the pivot pins as shown in FIG. 11 on pivot pin 264. Between side wall 216 and link 235' and also between side wall 217 and link 267, a ball bearing 243 is mounted on the upper front pivot pin 239 so as to roll with its outer race on the rail 245 while the pin 239 slides along the side wall slot 241. Similarly, pivot pin 238 slideable in slots 240 carries ball bearings 243 which roll on other rails 245. There are four laminated rubber springs, two upper ones 248, 248' and two lower ones 249 and 249'. The springs are of the type hereinbefore described. The upper springs are clamped together by screws 306 between two metal strips 307 and 308. Similarly, the lower springs 249 are clamped together by screws 306' between two strips 307' and 308'. Two channel-shaped pieces 309 and 310 are mounted on the front end pivot pin 271 and between the front end portions of the strips 308 and 308', so that they face each other with their hollow sides. Screws 311 complete the clamping of the springs in that one set of screws passes through strip 307, spring 248, strip 308, the channel piece 309, strip 308', springs 249, and strip 307'. Another set of screws 311 passes through the elements 307, 248', 308, 310, 308', 249' and 307'. Thus the front ends of the springs 248, 248', 249, 249' are anchored on the front end pivot pin 271. In the same manner, the rear ends of the springs are anchored on the rear end pivot pin 272. The springs 248, 248' are spaced from the springs 249, 249' so that the front central and rear central pivot pins 263 and 264 can travel in the space 312 therebetween.

Figure 6:
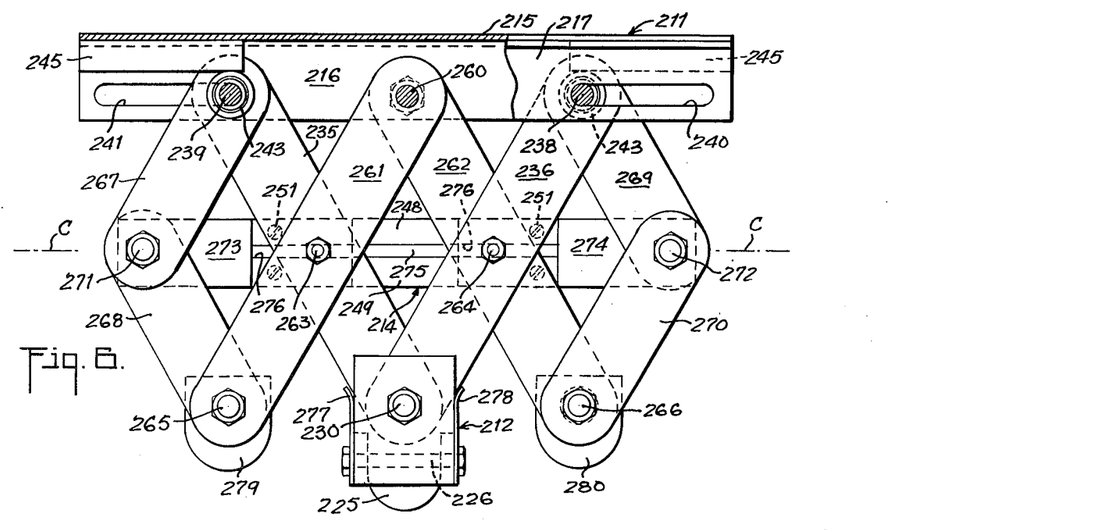
FIG. 6 is a side elevation, partly in section of another modification.

Contrary to FIG. 6 the foot bumper 212 and the ancillary bumpers 279, 280 are omitted in the embodiment of FIGS. 7 to 12. Instead thereof the front and rear lower pivot pins 365 and 366 are provided with rollers in the manner of roller skates. For this purpose the pivot pins 365 and 366 are extended on both ends so as to form stub axles 313, 314, 315 and 316. Each stub axle is provided with a pair of ball bearings 317 on which a roller 318 is mounted. The roller may be of any suitable type, such as e.g. a conventional wooden roller or a roller with rubber rim 319 such as frequently used for roller skating.

Figure 7:
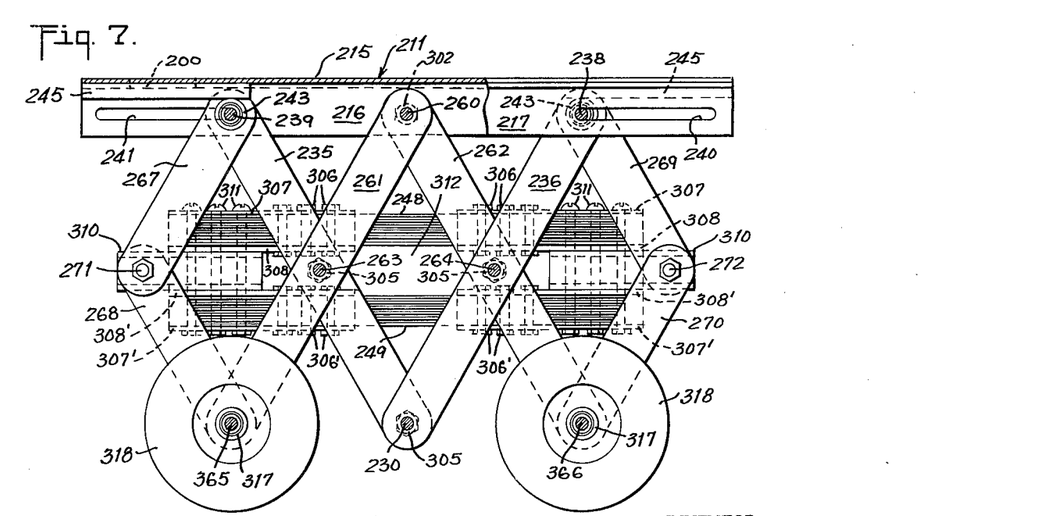
FIG. 7 is a side elevation partly in section of a fourth modification in an unloaded condition for use in roller-skate jumping.
Figure 12:
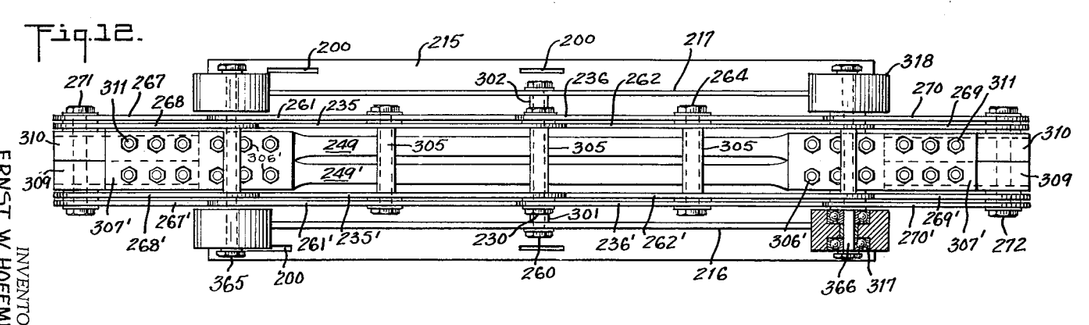
FIG. 12 is a bottom plan view of the modification of FIG. 7 under maximum load, wherein, however, smaller rollers are substituted for those shown in FIGS. 7 and 8.

When the shoe is not loaded or, when the user statically bears with his whole weight on one shoe, the device will be in the relative position of the parts as shown in FIG. 7 owing to the fact that the springs will have been attached with a preliminary tension as stated hereinbefore. Thus, the shoe may be used as a conventional roller skate. Owing, however, to the combination of the platform, the rollers, the lazy tongs-like links and the rubber springs, it becomes possible to perform jumps of a relatively great height. When the user jumps, the links will spread under the impact of the rollers hitting the ground and such spreading of the links and the consequent stretching of the rubber springs will be at a rate depending on the user's weight and the height of a jump. The maximum stretch will be reached when the pivot pins 238 and 239 are shifted to their outermost positions, as shown in FIGS. 8 and 12. Thus, the illustrated device according to the invention is useful as a jumping roller skate.

Figure 13:
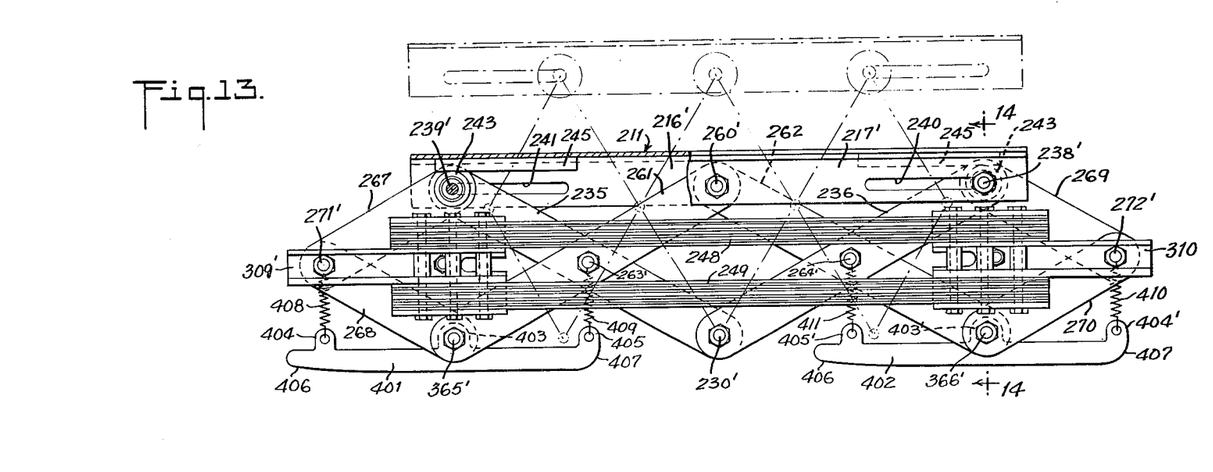
FIG. 13 is a diagrammatic longitudinal section of another modification for ice-skate jumping.

The modification of FIGS. 13 and 14 is shown in the end position of the device under maximum load. It is designed on the same principle as the roller skate jumping shoe of FIGS. 7 to 12 with the essential difference, however, that ice skate blades are substituted for the rollers. Owing to the fact, however, that the device of FIG. 13 has ice skate blades in one plane rather than in the two planes of the roller skate rollers, a further essential difference consists in that, as apparent from FIG. 14, it is possible to shorten the pivot pins of the lazy tongs-linkage and to arrange the rubber springs outside the links rather than between them as in FIG. 9. In FIG. 13 which shows the links merely diagrammatically, the links are denoted by the same reference numerals as in FIG. 7 whereas the shortened pivot pins have a prime sign (') added to the numerals by which the similarly located pins are denoted in FIG. 7. The platform 215 has the downwardly projecting side walls 216' between which the rails 245, ball bearings 243 and links 262, 236, 236' and 262' are arranged on the pivot pin 238' wherein, however, the spacing between the links 236 and 236' is shortened in comparison to FIG. 9. The channel-shaped anchoring pieces 309' and 310' are so positioned on the pins 271' and 272' that their hollows are on the outsides of the structure, the pins passing through the webs of the channels, and the rubber springs 248, 249, 248', 249' being clamped on the legs of the channels by means of the plates 307' and bolts 311.

Two blades 401 and 402 are provided. The first blade 401 has an upwardly projecting median lug 403 and two end lugs 404 and 405. Similarly, the rear blade 402 has the lugs 403', 404' and 405'. The forward ends of the blades are somewhat raised at 406 in order to prevent the blades from hooking into the ice. For a similar reason, the other ends are rounded at 407. The blades are located between the lower ends of the links, as clearly apparent from FIG. 14 and journaled with their median lugs 403 and 403' on the pivot pins 365' and 366', respectively. A tension spring 408, which may be a coil spring, is stretched between the lug 404 of blade 401 and the forward end pivot pin 271', and another spring 409 is connected to the lug 405 and the pivot pin 263'. Similar springs 410 and 411 connect lugs 404' and 405' to the pivot pins 272' and 264', respectively. The springs are so dimensioned and tensioned that the blades are held at all times substantially parallel to the platform.

Now it will be clear that the device of FIGS. 13 and 14 can be used for ice skating and particularly for jumping on the ice very similarly to the roller skate shoe of FIGS. 7 to 12.

Figure 15:
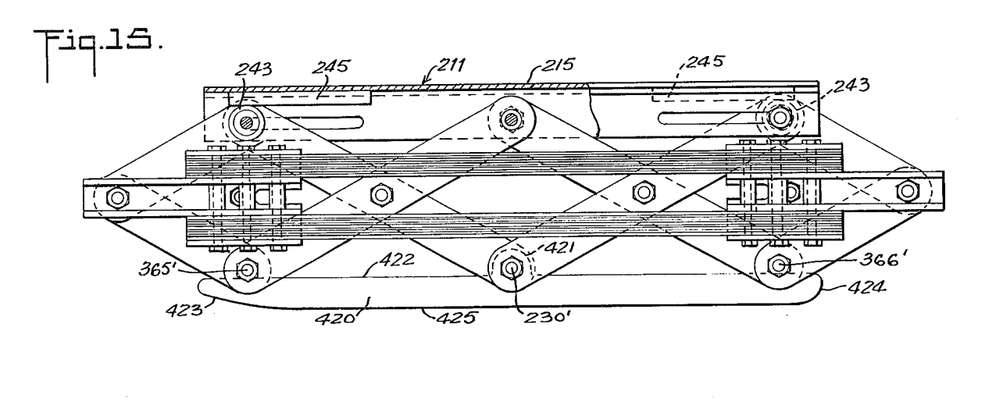
FIG. 15 is a view similar to FIG. 13 of a modification of the ice-skate jumping shoe.

The modification of FIG. 15 finally shows in an illustration similar to FIG. 13 an ice skate jumping shoe. Whereas all other parts in FIG. 15 are like those in FIG. 13, a single blade is substituted for the two blades 401 and 402 with their springs 408–411. This single blade 420 has one central lug 421 with which the blade is mounted on the pivot pin 230'. The upper edge 422 is straight. It is of such a length and so spaced from the center of the lug 230' that it permanently bears against both the pivot pins 365' and 366'. The ends 423 and 424 of the lower edge 425 of the blade are somewhat raised for the same reason as the ends of the blades in FIG. 13. It will be understood that when the user is jumping the pivot pins 365' and 366' will slide on the upper blade edge more or less outwards depending on the impact or load bearing on the shoe.

It will be apparent to those skilled in the art that without departure from the essence and spirit of the invention many alterations and modifications of the structure and other transmitting means can be applied for taking up the vertical platform movement by a longer stretching of a horizontally extending spring. For that reason the invention shall not be limited but by the scope of the appended claims.

I claim:

1. A jumping shoe comprising a platform adapted to receive thereon one of the user's feet and including means to secure said shoe to said foot, two elongated links underneath and in a plane lengthwise and vertical with respect to said platform and attached thereto so as to support said platform, said links being pivoted together at their lower ends, the upper ends of said links being spaced from each other so that said links are angularly spread apart V-shaped, second means secured to the underside of said platform and engaged by the upper ends of said links for guiding said upper ends for movement toward each other and away from each other longitudinally of said platform and in opposite directions, and for limiting said movement of said upper ends away from each other to respective positions thereof in which said links are spread apart not substantially more than 120 degrees, a tension spring secured with its ends to said links, respectively, at a distance from said pivot, and third means connected to said links for supporting them from the ground whereby, when said platform is being loaded said links will be further spread apart against the restraint of said spring, said links being parts of a lazy tongs-linkage having its central line parallel to said platform, said linkage including two end pivots on said central line, and said springs being spanned between and anchored to said end pivots.

2. A jumping shoe as in claim 1, said tension spring being a laminated rubber spring the laminae of which being slightly spaced from each other and said spring being under a preliminary tension when said platform is not loaded.

3. A jumping shoe comprising an elongated platform for one of the user's feet, a foot structure, a linkage connecting said foot structure to said platform and a plurality of laminated rubber springs, said linkage being in the form of a lazy tongs-like structure having its central line parallel with said platform and including two end pivots on said line, one median upper pivot on said platform in a fixed position relative thereto, an upper forward and an upper rearward pivot slidably guided on the underside of said platform so as to be limitedly movable in opposite longitudinal directions of said platform, and three lower pivots, said spring being spanned between and anchored to said end pivots, and said foot structure being attached to at least one of said lower pivots, whereby when said platform is being loaded, said upper pivots move from an inner to an outer end position against the restraint of said spring.

4. A jumping shoe as in claim 3, further comprising anchoring pieces connected to said end pivots, respectively, said springs being distanced from each other in the vertical direction and clamped to said anchoring pieces so that the pivots located on the central line of said linkage intermediate said end pivots can shift in the space between said springs.

5. A jumping shoe as in claim 3, said foot structure comprising a rubber buffer attached to the median one of said lower pivots, and means to ensure a position of said structure vertical in respect to said platform.

6. A jumping shoe as in claim 5, further comprising ancillary foot structures attached to the other two lower pivots so that the ancillary foot structures are on a level somewhat higher than said fiirst mentioned foot structure.

7. A jumping device as in claim 3, said foot structure comprising rollers similar to rollers used with roller skates, said rollers being pivoted on the forward one and the rearward one of said three lower pivots.

8. A jumping shoe as in claim 3 wherein two parallel sets of linkages are provided substantially on opposite sides of said platform, the forward one and rearward one of said three lower pivots including pivot pins extending outwardly beyond the associated links of said linkages so as to form stub axles, and said foot structure comprising four rollers mounted on said stub axles, respectively.

9. A jumping shoe as in claim 3, said foot structure comprising at least one ice skate blade.

10. A jumping shoe as in claim 3, said platform including a top plate adapted to receive thereon one of the user's feet, means to secure the platform to said foot, and two longitudinal downwardly extending side walls, all said pivots including pivot pins, respectively, the pivot pin of said upper median pivot being secured to said side walls, slots being provided in said side walls, the pivot pins of said upper forward and upper rearward pivots being guided in said slots, ball bearings mounted on said last mentioned pivot pins, guide rails secured to the underside of said platform laterally of said side walls, and said ball bearings being adapted to roll with their outer races on said rails when said pins shift along said slots.

11. A jumping shoe comprising an elongated platform for one of the user's feet, a foot structure, a linkage connecting said foot structure to said platform, and a plurality of laminated rubber springs, said linkage being in the form of a lazy tongs-like structure having its central line parallel with said platform and including a first V-forming pair of a first and a second link and having a common lower pivot in a vertical transverse median plane of said platform and an upper forward pivot of the first link and an upper rearward pivot of the other link of said pair, a second V-forming pair of a third and a fourth link and having a common upper pivot at said platform in said median plane and a forward lower pivot of the third link and a rearward lower pivot of said fourth link, said first and third links crossing and being pivoted to each other by a forward central pivot on said central line, and said third and fourth links crossing and being pivoted to each other by a rearward central pivot on said central lines, a forward upper and a forward lower end link having a common forward end pivot on said central line and being connected to said forward upper and lower pivots, respectively, and a rearward upper and rearward lower end link having a common rearward end pivot on said central line and being connected to said rearward upper and rearward lower pivots, respectively, said springs being spanned between and anchored to said end pivots, said upper forward and upper rearward pivots being slidably guided on the underside of said platform so as to be limitedly movable in opposite longitudinal directions of said platform against the restraint of said springs, and said foot structure being attached to at least one of said lower pivots.

12. A jumping shoe as in claim 11, said platform including a top plate adapted to receive thereon one of the user's feet, means to secure the platform to said foot, and two longitudinal downwardly extending side walls, all said pivots including pivot pins, respectively, said first, third, lower forward end, and upper rearward end links being located in one plane adjacent one of said platform side walls, said second, fourth, upper forward end and lower rearward end links being located in a second plane adjacent the other one of said platform side walls, ball bearings being mounted between said first and said second plane on said pivot pins of said forward and rearward upper pivots, respectively, and a rail being secured to the underside of said platform for the outer races of said bearings to roll thereon.

13. A jumping shoe as in claim 12, further comprising a spacer sleeve between the associated links of the pivot pins of the forward and rearward end pivots, and anchoring means for said springs, said anchoring means including, for each of the pivot pins of said end pivots, two channel-shaped pieces mounted with their webs on portions extending from both ends of the pivot pin, the four legs of said channel-shaped pieces extending outwardly and carrying each one end of one spring clamped thereto.

14. A jumping shoe as in claim 12, further comprising spacer sleeves on said lower forward and rearward pivot pins, respectively, between the associated links, said pins being outwardly extended so as to form stub axles, and roller skate rollers including ball bearings mounted on said stub axles.

15. A jumping shoe as in claim 11, said foot structure comprising an ice skate blade journaled with its central portion on the common lower pivot of said first V-forming pair of links, and bearing with its end portions from below against said forward and rearward lower pivots, respectively.

16. A jumping shoe as in claim 11, said foot structure comprising a forward and a rearward ice skate blade, said blades being journaled with their central portion on said forward and rearward lower pivots, respectively, a first pair of additional springs connecting the front and rear ends of said forward blade to said forward end pivot and to said forward central pivot, respectively, and a second pair of additional springs connecting the front and rear ends of said rearward blade to said rearward central pivot and said rearward end pivot, respectively.

References Cited by the Examiner

UNITED STATES PATENTS 1,613,538   1/27   Schad _________________ 36—7.8

FOREIGN PATENTS 770,727   7/34   France.

RICHARD C. PINKHAM, *Primary Examiner.*

JAMES W. LOVE, LEONARD W. VARNER, LOUIS R. PRINCE, *Examiners.*